Feb. 20, 1940.　　　　F. M. YOUNG　　　　2,190,856
GEARSHIFT FOR WASHING MACHINE WRINGERS
Filed Dec. 15, 1938　　　　2 Sheets-Sheet 1
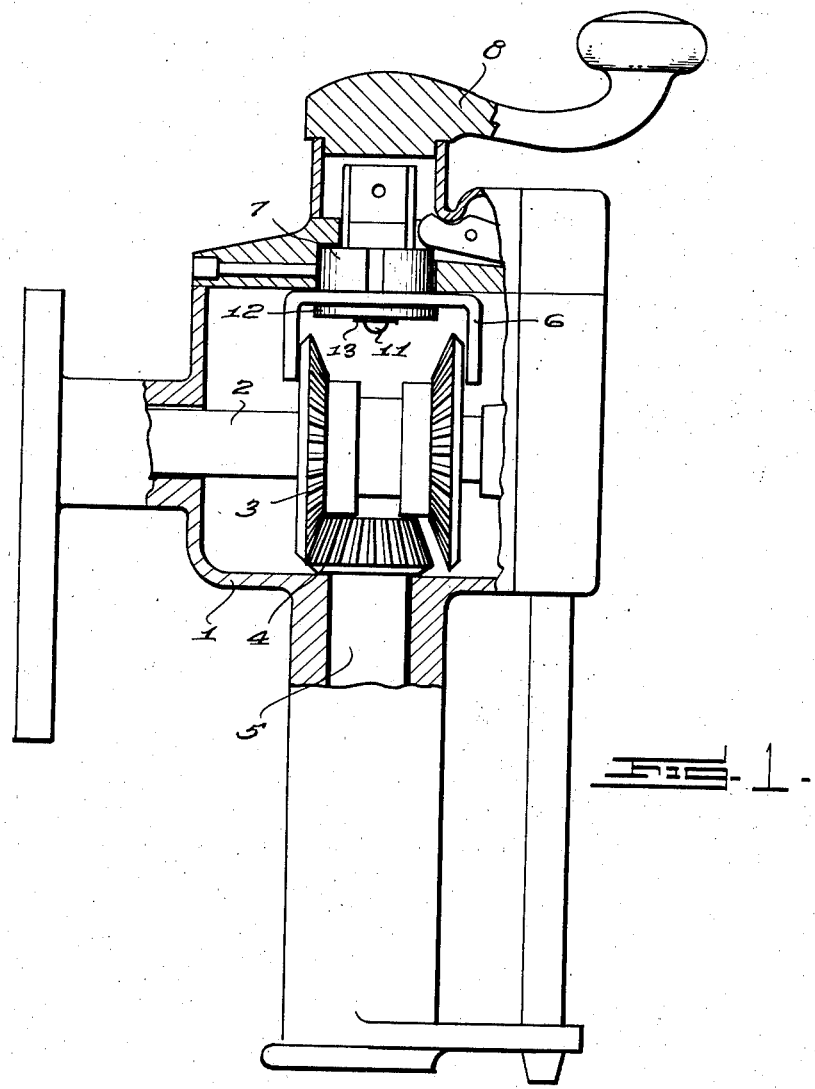
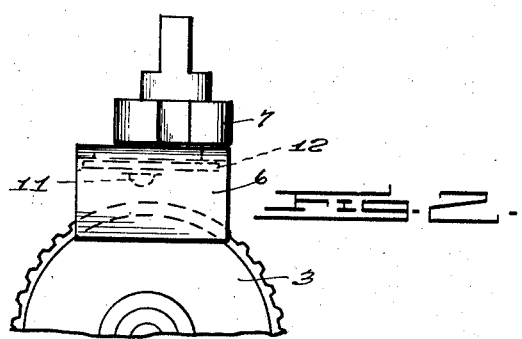
Inventor
FRANK M. YOUNG,
By *Clarence A. O'Brien and Hyman Berman*
Attorneys

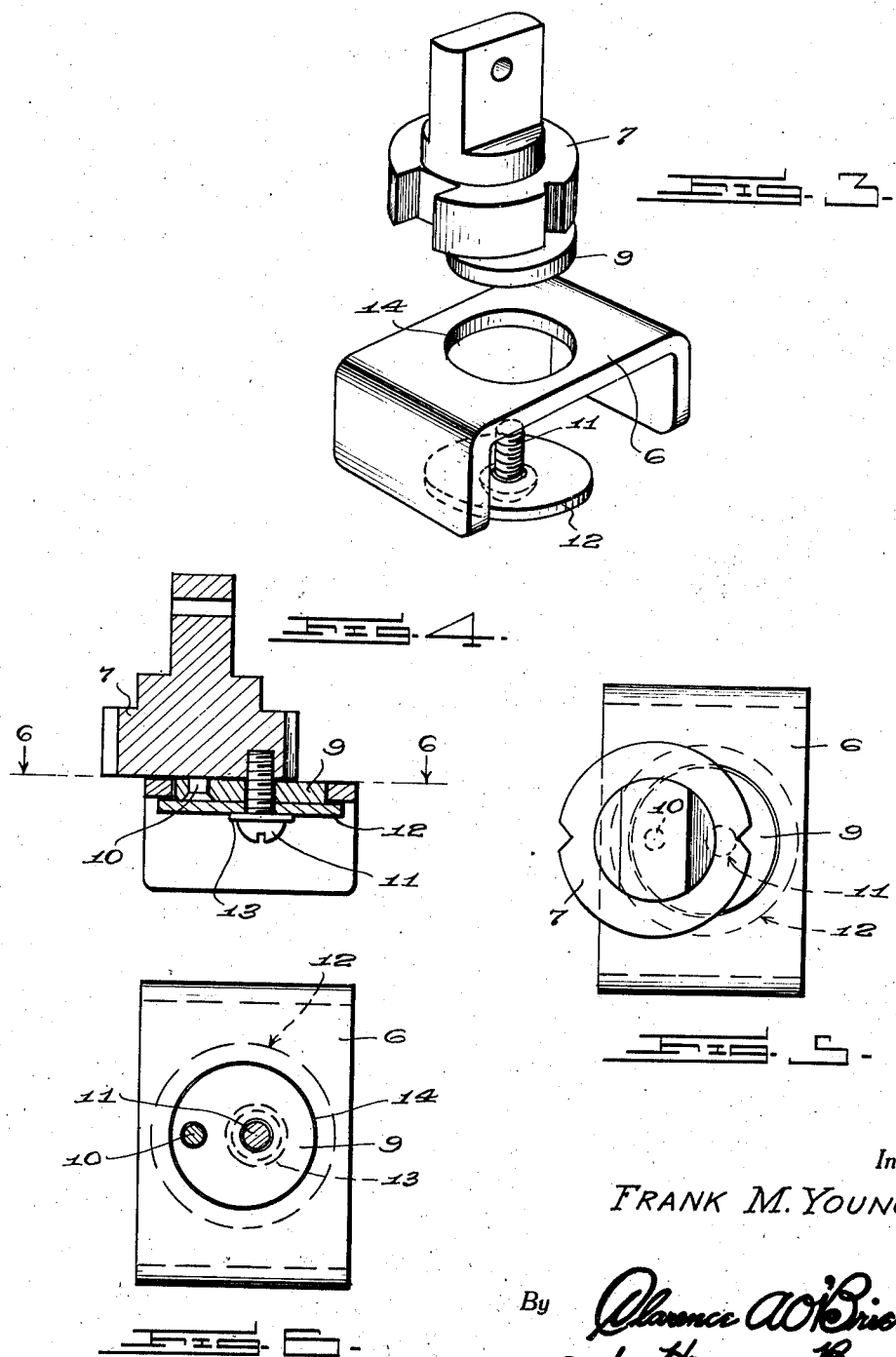

Patented Feb. 20, 1940

2,190,856

UNITED STATES PATENT OFFICE 2,190,856

GEARSHIFT FOR WASHING MACHINE WRINGERS

Frank M. Young, Kissimmee, Fla., assignor to The Maytag Company, Newton, Iowa, a corporation of Delaware Application December 15, 1938, Serial No. 245,995

2 Claims. (Cl. 74—473)

This invention relates to improved means for shifting the twin gears of a washing machine wringer, the general object of the invention being to provide an improved connection between the manually operated rotary member and the yoke which shifts the twin gears so as to practically eliminate wear between the parts and insure full mesh of the gearing.

This invention also consists in certain other features of construction and in the combination and arrangement of the several parts to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:

Figure 1 is an elevation with parts in section showing the improved means for shifting the twin gears of the drive means for the rollers of a wringer.

Figure 2 is an end view of the yoke and a portion of the twin gear assembly and also showing the rotary member.

Figure 3 is a perspective view with the parts separated.

Figure 4 is a vertical sectional view through the rotary member, yoke and the means for connecting the yoke with the rotary member.

Figure 5 is a top plan view of the parts shown in Figure 4.

Figure 6 is a section on the line 6—6 of Figure 4.

In these drawings the numeral 1 indicates the gear housing of a washing machine wringer, the numeral 2 indicates a shaft which is connected with one of the rollers of the wringer and on which the twin gear assembly 3 is slidably arranged so that either one of the twin gears can be placed in mesh with the beveled gear 4 of the drive shaft 5. The yoke for shifting the twin gear is shown at 6 and the rotary member for moving the yoke is shown at 7, this rotary member being connected to a handle 8 so that by turning the handle the member 7 will be caused to move the yoke 6 to shift the gears in the usual manner.

As now constructed a small pin is eccentrically connected with the member 7 and passes into a transverse slot in the yoke but after use either this pin or the walls of the slot soon wear so that the gears 3 do not properly mesh with the gear 4 which results in wear of the gears and usually the gear 4 has to be replaced after the machine has been in use for a comparatively short period of time.

It is my object to improve the connection between the member 7 and the yoke and in carrying out my invention I provide a disk 9 which is eccentrically connected to the member 7 by a rivet 10 and a screw or bolt 11, said screw or bolt passing through a large washer 12, a hole in the disk 9 and into a threaded hole in the lower end of the member 7. A lock washer 13 is placed between the head of the screw and the washer 12. The yoke 6 has a large circular hole 14 formed in its bight for receiving the eccentric disk 9. Thus when the member 7 is turned by the handle 8 the eccentric disk 9 operating in the hole 14 shifts the yoke which in turn shifts the gears 3.

Thus the relatively large eccentric disk 9 operating in the large hole 14 of the yoke will positively mesh the gears 3 with the gear 4 and practically all wear between the disk 9 and the walls of the hole 14 is eliminated.

It is thought from the foregoing description that the advantages and novel features of the invention will be readily apparent.

It is to be understood that changes may be made in the construction and in the combination and arrangement of the several parts provided such changes fall within the scope of the appended claims.

Having described the invention, what is claimed as new is:

1. In a device of the class described, a gear shifting yoke having a large circular hole in its bight, a rotary member, a disk eccentrically connected with the rotary member and fitting in the hole for shifting the yoke when the rotary member is turned.

2. In a device of the class described, a gear shifting yoke having a large circular hole in its bight, a rotary member, a disk eccentrically connected with the rotary member and fitting in the hole for shifting the yoke when the rotary member is turned, said disk being connected with the rotary member by an eccentrically arranged pivot and a bolt passing through the disk into the rotary member, a washer larger than the disk through which the bolt passes.

FRANK M. YOUNG.